(12) United States Patent
Son et al.

(10) Patent No.: US 9,830,033 B2
(45) Date of Patent: Nov. 28, 2017

(54) TOUCH SENSOR AND METHOD OF MANUFACTURING THE SAME

(71) Applicant: Samsung Display Co., Ltd., Yongin-si (KR)

(72) Inventors: Jung Ha Son, Seoul (KR); Jae Neung Kim, Seoul (KR); Yong-Hwan Ryu, Yongin-si (KR); Yun Jong Yeo, Seoul (KR); Joo Hyung Lee, Seongnam-si (KR); Yu-Gwang Jeong, Anyang-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 23 days.

(21) Appl. No.: 14/925,439

(22) Filed: Oct. 28, 2015

(65) Prior Publication Data

US 2016/0320876 A1 Nov. 3, 2016

(30) Foreign Application Priority Data

Apr. 30, 2015 (KR) ........................ 10-2015-0062038

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01); *G06F 2203/04102* (2013.01); *G06F 2203/04103* (2013.01)

(58) Field of Classification Search
CPC .......... G06F 3/044; G06F 2203/04102; G06F 3/0416; G06F 2203/04103
See application file for complete search history.

(56) References Cited

U.S. PATENT DOCUMENTS

| 2011/0248970 | A1* | 10/2011 | Koyama | ............ G02F 1/13452 |
| | | | | 345/204 |
| 2013/0273315 | A1* | 10/2013 | Mansky | ................... H01B 7/00 |
| | | | | 428/138 |
| 2014/0340597 | A1 | 11/2014 | Sato | |
| 2015/0324042 | A1* | 11/2015 | Hu | ......................... B32B 27/32 |
| | | | | 345/173 |

FOREIGN PATENT DOCUMENTS

| JP | 2013117816 | 6/2013 |
| KR | 1020140091403 | 7/2014 |
| KR | 1020140134619 | 11/2014 |

* cited by examiner

*Primary Examiner* — Charles Hicks
(74) *Attorney, Agent, or Firm* — H.C. Park & Associates, PLC

(57) ABSTRACT

A touch sensor includes a touch substrate including a touch sensing area and a non-sensing area outside the touch sensing area, touch electrodes disposed in the touch sensing area and configured to sense a touch, and touch wiring connected to the touch electrodes in the non-sensing area, in which the touch wiring includes a first wiring conductive layer, a second wiring conductive layer disposed on the first wiring conductive layer, and transparent layers disposed at first and second sides of the second wiring conductive layer and on the first wiring conductive layer.

20 Claims, 14 Drawing Sheets

TOUCH SENSOR AND METHOD OF MANUFACTURING THE SAME

CROSS-REFERENCE TO RELATED APPLICATION

This application claims priority from and the benefit of Korean Patent Application No. 10-2015-0062038, filed on Apr. 30, 2015, which is hereby incorporated by reference for all purposes as if fully set forth herein.

BACKGROUND

Field

Exemplary embodiments relate to a touch sensor and a method of manufacturing the same, and more particularly, to a touch sensor including metal nanowire and a method of manufacturing the same.

Discussion of the Background

Display devices, such as a liquid crystal display (LCD), an organic light emitting display (OLED), and an electrophoretic display (EPD), portable transmission devices, and other information processing devices, and the like, may perform a function through an input from various input devices. Recently, an input device including a touch sensing function has been used as the input device.

The touch sensing function may sense a change in pressure, charge, light, and the like, applied to a screen of a display device, to detect an object's approach or contact to the screen, or contact position information, which may occur when the object, such as a user's finger, a touch pen, or the like, approaches or contacts the screen to write characters or draw pictures. The display device may receive an image signal and display an image, based on the contact information.

The touch sensing function may be implemented by a touch sensor. The touch sensor may be classified into various touch sensing types, such as a resistive type, a capacitive type, an electromagnetic resonance type (EMR), and an optical type.

Generally, the resistive type and the capacitive type have been mainly used. In the resistive type touch sensor, two spaced apart electrodes, which face each other, may contact each other by a pressure applied from external objects. When the two electrodes contact each other, a resistance thereof may be changed. As such, contact positions, and the like, may be detected by recognizing a change in voltage at the contact position.

The capacitive type touch sensor may include a sensing capacitor formed of a sensing electrode. The sensing electrode may transfer a sensing signal and sense a change in capacitance of the sensing capacitor, which may be generated when conductors, such as a finger, approach the sensor, to detect a touch in the touch screen, touched positions, and the like. The capacitive type touch sensor may sense a touch when the user or a conductive object touches the touch screen.

A flexible electronic device may include a touch screen. Due to flexible characteristics of the flexible electronic device, an electrode of the touch screen may also be flexible to prevent occurrence of defects. As a material of the electrode having flexibility, various materials, such as metal nanowire, for example, silver nanowire (AgNW), etc., carbon nanotube (CNT), graphene, metal mesh, and conductive polymer have been researched. Since these materials may have low conductivity, low resistance metals, such as copper, may be used to supplement conductivity of a wiring part of the touch screen. However, the low resistance metal such as copper may have low flexibility and be easily oxidized, thereby generating corrosion therein. The corrosion of the low resistance metal may be spread to the entire touch screen, which may deteriorate reliability of the touch screen.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensor and a method of manufacturing the same that has excellent flexibility and prevent corrosion.

Additional aspects will be set forth in the detailed description which follows, and, in part, will be apparent from the disclosure, or may be learned by practice of the inventive concept.

An exemplary embodiment discloses a touch sensor including a touch substrate including a touch sensing area and a non-sensing area outside the touch sensing area, touch electrodes disposed in the touch sensing area and configured to sense a touch, and touch wiring connected to the touch electrodes in the non-sensing area, in which the touch wiring includes a first wiring conductive layer, a second wiring conductive layer disposed on the first wiring conductive layer, and transparent layers disposed at first and second sides of the second wiring conductive layer and on the first wiring conductive layer.

An exemplary embodiment also discloses a method for manufacturing a touch sensor including sequentially depositing a first conductive layer, a transparent layer, and a photosensitive film on a touch substrate, the touch substrate including a touch sensing area and a non-sensing area, patterning the transparent layer and the photosensitive film to expose a portion of the first conductive layer in the non-sensing area, depositing a second conductive layer on the exposed portion of the first conductive layer and the photosensitive film, etching the second conductive layer, such that a height of the second conductive layer disposed on the exposed portion of the first conductive layer is substantially equal to a height of the transparent layer, removing the photosensitive film and the transparent layer disposed on the photosensitive film using a lift-off method, and etching the first conductive layer and the transparent layer to form a touch wiring and touch electrodes, in which the touch wiring includes the second conductive layer disposed on the first conductive layer, and transparent layers disposed at left and right sides of the second conductive layer in the non-sensing area, and the touch electrodes includes a first electrode and a second electrode insulated from each other in the touch sensing area.

According to exemplary embodiments, a wiring part may have improve flexibility and prevent generation of corrosion in a touch screen by including metal nanowire and aluminum in the wiring part. The wiring part may be manufactured by forming a transparent film and aluminum on the metal nanowire using the lift off method.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
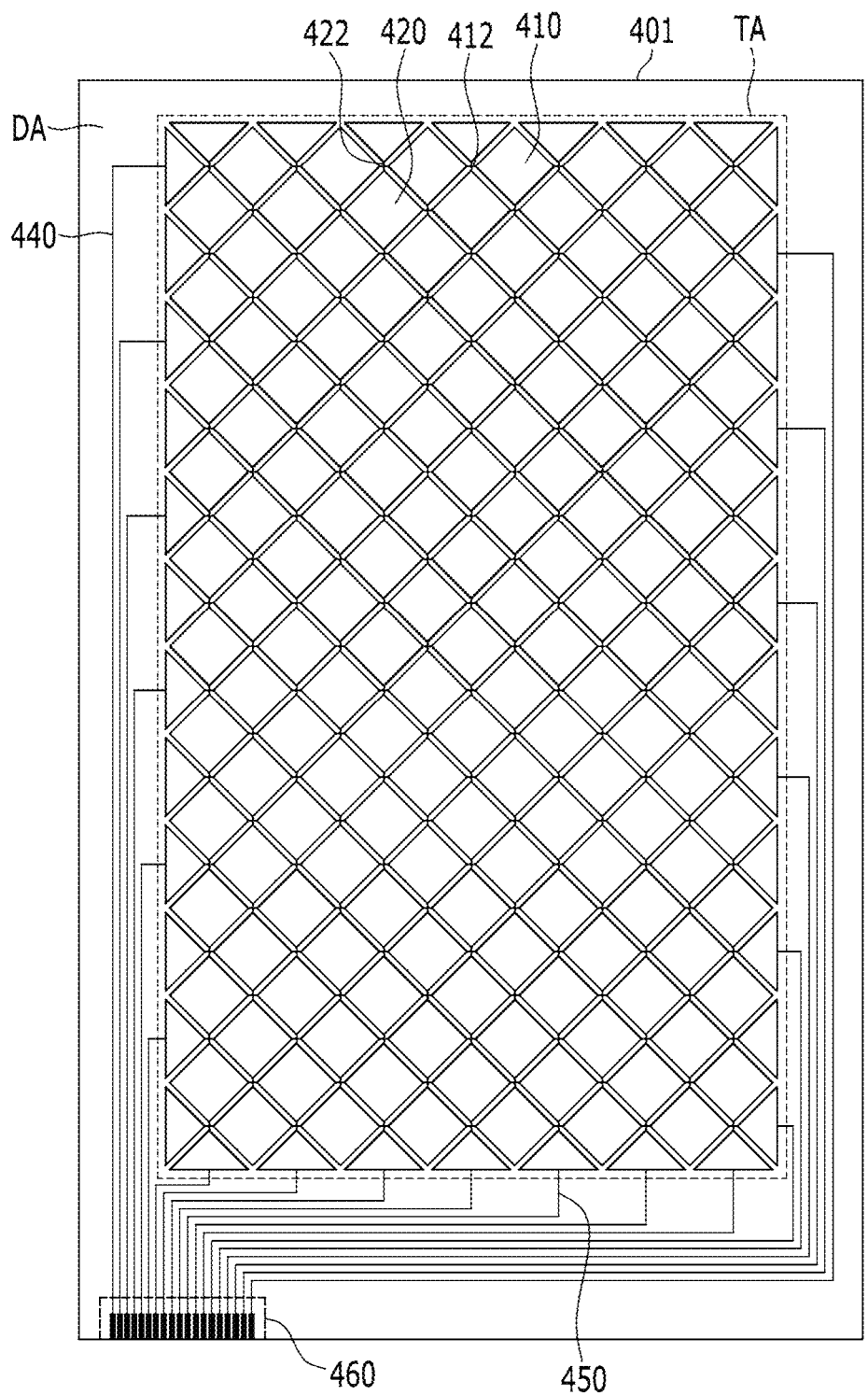
FIG. 1 is a plan view of a touch sensor according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
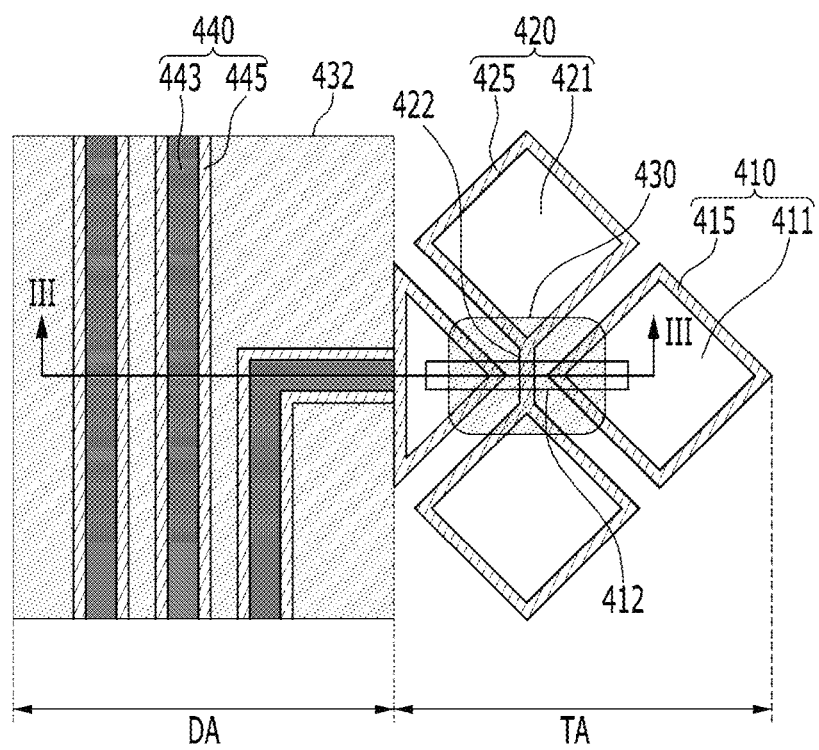
FIG. 2 is a plan view illustrating a touch electrode and a wiring part included in a touch sensor according to an exemplary embodiment.
Figure 3:
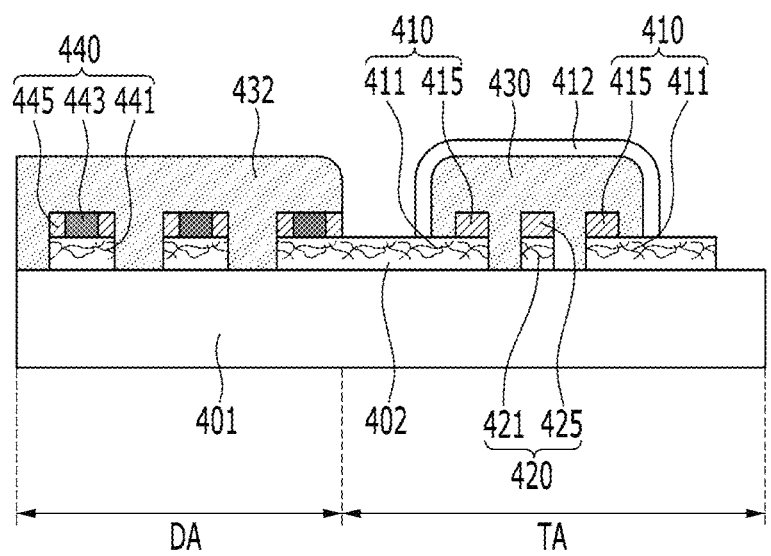
FIG. 3 is a cross-sectional view taken along line III-III' of the touch sensor of FIG. 2.

FIG. 1 is a plan view of a touch sensor according to an exemplary embodiment. FIG. 2 is an enlarged view of region A of FIG. 1 and a plan view illustrating a touch electrode and a wiring part included in a touch sensor according to an exemplary embodiment. FIG. 3 is a cross-sectional view taken along line III-III' of the touch sensor of FIG. 2.

Referring to FIG. 1, the touch sensor according to the present exemplary embodiment may include touch electrodes 410 and 420 disposed on a touch substrate 401 and touch wirings 440 and 450 connected to the touch electrodes 410 and 420. The touch substrate 401 may be a flexible, transparent substrate.

The touch electrodes 410 and 420 may include a first electrode 410 and a second electrode 420 insulated from each other in a touch sensing area TA. The first electrode 410 and the second electrode 420 may be alternately disposed. The first electrodes 410 may be disposed along a column direction and a row direction, respectively, and the second electrodes 420 may be disposed in a column direction and a row direction, respectively.

The first electrode 410 and the second electrode 420 may be disposed on the same layer or on different layers. When the first electrode 410 and the second electrode 420 are disposed on different layers, the first electrode 410 and the second electrode 420 may be disposed on different surfaces of the touch substrate 401, or on the same surface of the touch substrate 401.

The first electrode 410 and the second electrode 420 may each have a quadrangle shape. The shape of the first electrode 410 and the second electrode 420 may vary, such as including a protrusion therein, to improve sensitivity of the touch sensor.

The first electrodes 410 arranged in the same row or column may be connected to or separated from each other inside or outside the touch sensing area TA. At least a portion of the second electrodes 420 arranged in the same row or column may also be connected to or separated from each other inside or outside the touch sensing area TA. For example, as illustrated in FIG. 1, when the first electrodes 410 disposed in the same row are connected to each other inside the touch sensing area TA, the second electrodes 420 disposed in the same column may be connected to each other inside the touch sensing area TA. More particularly, the first electrode 410 disposed in each row are connected to each other through a first connection part 412, and the second electrodes 420 disposed in each column may be connected to each other through a second connection part 422.

The first electrodes 410 connected to each other in each row may be connected to a touch driver (not illustrated) through the first touch wiring 440, and the second electrodes 420 connected to each other in each column may be connected to the touch driver through the second touch wiring 450. The first touch wiring 440 and the second touch wiring 450 may disposed in a non-sensing area DA, which is an outside area of the touch sensing area TA. Alternatively, the first touch wiring 440 and the second touch wiring 450 may be disposed in the touch sensing area TA. Ends of the first touch wiring 440 and the second touch wiring 450 may form a pad part 460 in the non-sensing area (DA) of the touch sensor 400.

The first touch wiring 440 may input a sensing input signal to the first electrode 410 or output a sensing output signal to the touch driver through the pad part 460. The second touch wiring 450 may input the sensing input signal to the second electrode 420 or output the sensing output signal to the touch driver through the pad part 460.

The first electrode 410 and the second electrode 420 adjacent to each other may form a mutual sensing capacitor, which may serve as the touch sensor. The mutual sensing capacitor may receive a sensing input signal through one of the first and second electrodes 410 and 420. The other one of the first and second electrodes 410 and 420 may output a change in an amount of electrical charge, due to a contact of an external object, as a sensing output signal.

According to an exemplary embodiment, the first electrodes 410 and the second electrodes 420 may be separated from each other and connected to the touch driver through corresponding touch wirings (not illustrated). In this case, the respective touch electrodes 410 and 420 may form a self-sensing capacitor as the touch sensor. The self-sensing capacitor may receive a sensing input signal and be charged with a predetermined amount of electrical charge. When the external object, such as a finger, contacts the touch sensor, the amount of electrical charge charged in the self-sensing capacitor may change, and output a sensing output signal different from the received sensing input signal.

Hereinafter, the touch electrode and the wiring part included in the touch sensor according to an exemplary embodiment will be described in detail with reference to FIGS. 2 and 3, along with FIG. 1.

Referring to FIGS. 1 to 3, the touch electrodes 410 and 420 according to the present exemplary embodiment may be disposed in the touch sensing area TA of the touch substrate 401, and the touch wirings 440 and 450 may be disposed in the non-sensing area DA of the touch substrate 401.

The touch substrate 401 may be made of plastic, such as polycarbonate, polyimide, and polyether sulfone, or glass, or the like. The touch substrate 401 may be a transparent flexible substrate, such that the touch substrate 401 may have elasticity or may be folded, bent, rolled, or stretched in at least one direction.

The touch electrodes 410 and 420 include the first electrode 410 and the second electrode 420. The first electrode 410 and the second electrode 420 may be alternately disposed and insulated from each other. Each of the first electrode 410 and the second electrode 420 may include lower electrode conductive layers 411 and 421 and upper electrode conductive layers 415 and 425.

The first electrode 410 may include the first lower electrode conductive layer 411 and the first upper electrode conductive layer 415 disposed on an edge of the first lower electrode conductive layer 411. Alternatively, the first upper electrode conductive layer 415 may be formed over the entire first lower electrode conductive layer 411.

The first lower electrode conductive layer 411 may include metal nanowire of silver (Ag), copper (Cu), etc. The metal nanowires included in the first lower electrode conductive layer 411 may be connected to each other in a mesh form, so as to form a conductive electrode.

The first lower electrode conductive layer 411 including the metal nanowire may have high transmittance and sheet resistance characteristic, which is less than a predetermined reference, thereby having high conductivity. The first lower electrode conductive layer 411 may have higher flexibility than that of the transparent conductive material, such as indium tin oxide (ITO) and indium zinc oxide (IZO). The metal nanowire may be formed by various processes, such as a solution process, spray, a printing method, etc.

The first lower electrode conductive layer 411 may include an overcoat 402, which may protect and fix the metal nanowire. The overcoat 402 may include acrylate-based organic materials, such as acryl polyester resin, which may be coated on the metal nanowire to form the overcoat 402. The overcoat 402 may fill a space between the metal nanowires and increase an adhesion between the metal nanowire and the touch substrate 401.

The second electrode 420 may include the second lower electrode conductive layer 421 and the second upper electrode conductive layer 425 disposed on an edge of the second lower electrode conductive layer 421. Alternatively, the second upper electrode conductive layer 425 may be formed over the entire second lower electrode conductive layer 421.

The second lower electrode conductive layer 421 may include the same material as the first lower electrode conductive layer 411, and may be formed on the same layer as the first lower electrode conductive layer 411. The second upper electrode conductive layer 425 may include the same material as the first upper electrode conductive layer 415, and may be formed on the same layer as the first upper electrode conductive layer 415.

The first touch wiring 440 may be connected to the first electrode 410 and the second touch wiring may be connected to the second electrode 420. The first touch wiring 440 includes a first wiring conductive layer 441, a second wiring conductive layer 443, and a transparent layer 445, which are disposed on the first wiring conductive layer 441.

The first wiring conductive layer 441 may include the same material and disposed on the same layer as the first lower electrode conductive layer 411 and the second lower electrode conductive layer 421. More particularly, the first wiring conductive layer 441 may include the metal nanowire, such as silver and copper. The metal nanowires included in the first wiring conductive layer 441 may be connected to each other in a mesh form, to form a conductive electrode. The first wiring conductive layer 441 may further include the overcoat 402, which may protect and fix the metal nanowire. The first wiring conductive layer 441 including the metal nanowire may have high transmittance and sheet resistance characteristic, which is less than a predetermined reference, thereby having high conductivity. The first wiring conductive layer 441 may have higher flexibility than that of the transparent conductive materials, such as ITO and IZO.

The second wiring conductive layer 443 may supplement the conductivity of the first wiring conductive layer 441 including the metal nanowire, and include aluminum, which has an excellent flexibility. In general, a conventional second wiring conductive layer of a touch sensor may include copper, which is a low resistance metal. However, the copper may have deteriorating flexibility. According to the present exemplary embodiment, the second wiring conductive layer 443 may include aluminum having excellent flexibility, thereby improving the flexibility of the flexible touch sensor.

Figure 4:
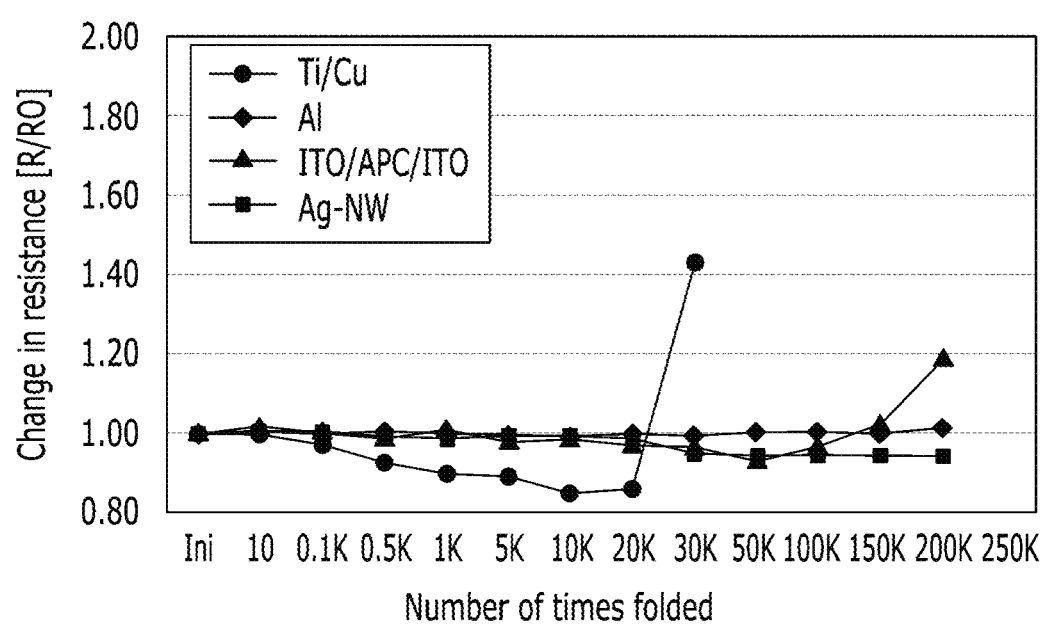
FIG. 4 is a diagram illustrating flexibility of a touch wiring according to an exemplary embodiment.

FIG. 4 is a diagram illustrating a flexibility of a touch wiring according to an exemplary embodiment. A horizontal axis plots a folding frequency of the touch wiring and a vertical axis plots a change in resistance.

Referring to FIG. 4, when titanium/copper (Ti/Cu) material is folded over 20,000 times, the change in resistance sharply rises. When indium tin oxide/sliver, palladium (Pd), and copper (APC) alloy (ITO/APC/ITO) material is folded over 150,000 times, the change in resistance sharply rises. However, aluminum and silver nanowire have a constant change in resistance, independent of the folding frequency. As such, the touch wiring according to the present exemplary embodiment may improve the flexibility of the flexible touch sensor, by disposing the second wiring conductive layer 443 including aluminum on the first wiring conductive layer 441 including silver nanowire.

Referring back to FIGS. 2 and 3, a transparent layer 445 is disposed on left and right sides of the second wiring conductive layer 443. The transparent layer 445 may include silicon oxide ($SiO_x$) or aluminum oxide ($AlO_x$), which is an oxide-based transparent material. When the first touch wiring 440 is formed only of the first wiring conductive layer 441 including the metal nanowire and the second wiring conductive layer 443 including aluminum, which is disposed on the first wiring conductive layer 441, it may be difficult to selectively dry etch the metal nanowire and the aluminum.

As such, in the touch wiring 440 according to the present exemplary embodiment, the left and right sides of the second wiring conductive layer 443 are provided with the transparent layer 445, which includes the oxide-based transparent material, to selectively dry etch the metal nanowire, thereby improving flexibility.

More particularly, when the first wiring conductive layer 441 including the metal nanowire and the second wiring conductive layer 443 including the aluminum are dry etched to form the touch wiring 440, an etching gas including chlorine gas ($Cl_2$) may be used. However, the chlorine (Cl) may etch not only the aluminum, but also the metal nanowire, which may damage the first wiring conductive layer 441. Accordingly, in the touch wiring 440 according to the present exemplary embodiment, the transparent layers 445 including transparent materials, such as $SiO_x$ or $AlO_x$, are disposed at left and right sides of the second wiring conductive layer 443, which includes the aluminum and is disposed on the first wiring conductive layer 441 including the metal nanowire.

The touch wiring 440 according to the present exemplary embodiment may be formed by dry etching the first wiring conductive layer 441 including the metal nanowire and the transparent layer 445 including the transparent materials, such as $SiO_x$ or $AlO_x$. In this case, carbon tetrafluoride ($CF_4$) may be mainly used as the etching gas, and an energy applied to the etching gas may prompt reaction between fluorine (F) and $SiO_x$ or $AlO_x$. That is, the fluorine included in the etching gas may selectively etch the transparent layer 445, and not react with the metal nanowire, thereby preventing damage to the first wiring conductive layer 441.

As such, the touch wiring 440 according to the present exemplary embodiment includes the second wiring conductive layer 443 and the transparent layers 445, which are formed on the first wiring conductive layer 441, thereby selectively etching the second wiring conductive layer 443 and improving the flexibility.

Next, a method for manufacturing a touch sensor according to an exemplary embodiment will be described with reference to FIG. 5, FIG. 6, FIG. 7, FIG. 8, FIG. 9A, FIG. 9B, FIG. 10A, FIG. 10B, FIG. 11A, and FIG. 11B, along with the above-mentioned drawings.

FIGS. 5 to 11 are diagrams sequentially illustrating a manufacturing process of a touch sensor according to an exemplary embodiment. FIG. 9B is a cross-sectional view of an intermediate product of FIG. 9A taken along line IX-IX'. FIG. 10B is a cross-sectional view of an intermediate product of FIG. 10A taken along line X-X'. FIG. 11B is a cross-sectional view of an intermediate product of FIG. 11A taken along line XI-XI'.

Figure 5:
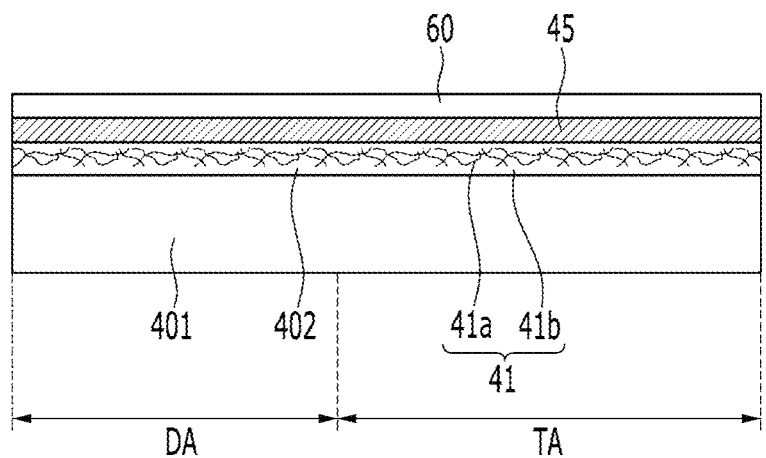
FIG. 5, FIG. 6, FIG. 7, FIG. 8, FIG. 9A, FIG. 9B, FIG. 10A, FIG. 10B, FIG. 11A, and FIG. 11B are diagrams sequentially illustrating a manufacturing process of forming a touch sensor according to an exemplary embodiment.

First, referring to FIG. 5, a touch substrate 401 including flexible materials, such as polycarbonate, polyimide, polyether sulfone, etc., is prepared. A metal nanowire layer 41a including metal nanowire of silver, copper, etc., is disposed on the touch substrate 401 by various methods, such as a solution process, spray, and a printing method.

Next, an acrylate-based organic material, such as acryl polyester resin, etc., is coated on the metal nanowire layer 41a to form an overcoat 41b. The metal nanowire layer 41a and the overcoat 41b together form the first conductive layer 41. Next, a conductive material is disposed on the first conductive layer 41 by a sputtering method, etc., to form a transparent layer 45. The transparent layer 45 may include $SiO_x$ or $AlO_x$, which is an oxide-based transparent and conductive material. Next, a photosensitive film 60 is coated on the transparent layer 45.

Figure 6:
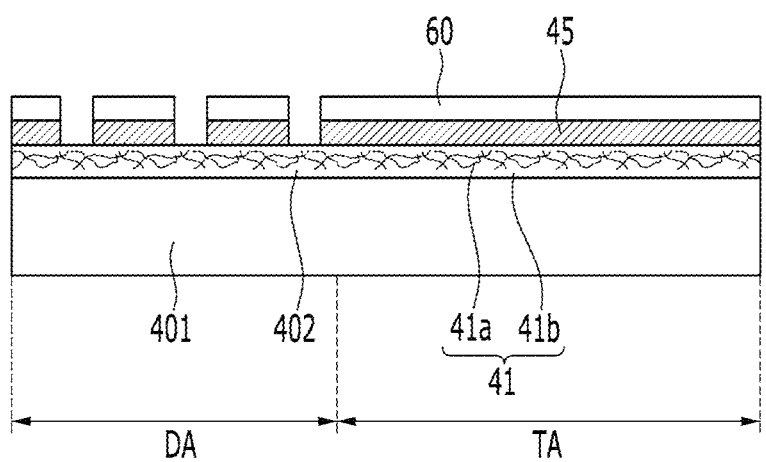

Referring to FIG. 6, the photosensitive film 60 and the transparent layer 45 are exposed and developed in the non-sensing area DA of the touch substrate 401, such that the photosensitive film 60 and the transparent layer 45 are patterned to expose a portion of the first conductive layer 41 in the non-sensing area DA.

Figure 7:
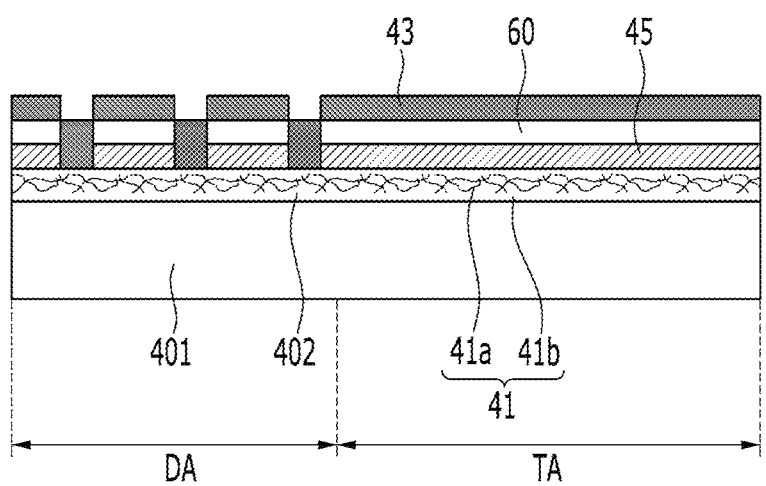

Referring to FIG. 7, the second conductive layer 43 is deposited on the exposed first conductive layer 41 and the photosensitive film 60 by the sputtering method, etc. The second conductive layer 43 may include aluminum having excellent flexibility.

Figure 8:
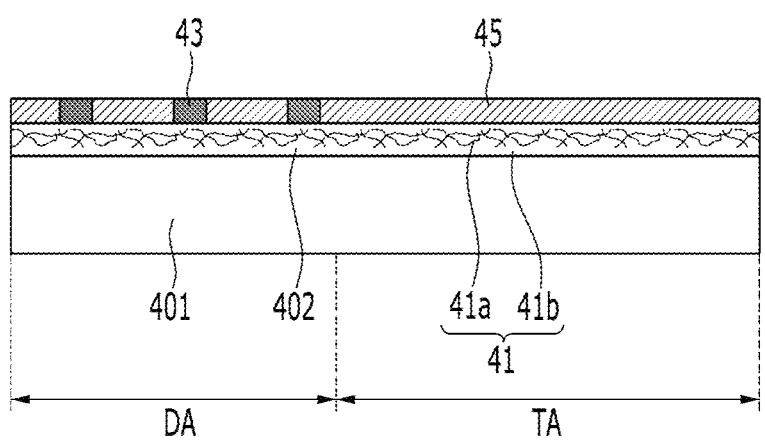

Next, referring to FIG. 8, a portion of the second conductive layer 43 disposed on the exposed first conductive layer 41 is dry etched to lower a height of the second conductive layer 43. Accordingly, the height of an upper surface of the second conductive layer 43 disposed on the exposed first conductive layer 41 may substantially be equal to a height of an upper surface of the transparent layer 45 in the touch sensing area TA. Alternatively, the second conductive layer 43 disposed on the photosensitive film 60 and the second conductive layer 43 disposed on the exposed first conductive layer 41 may be dry etched at different etching rates, by dry etching with strong anisotropy. In this case, the height of the transparent layer 45 and the height of the second conductive layer 43 disposed on the exposed first conductive layer 41 may be formed to be substantially equal to each other by an end point detect (EPD) method. The end point detect (EPD) method may be a generally known technology, and therefore, a detailed description thereof will be omitted.

Next, the photosensitive film 60 and the second conductive layer 43 disposed on the photosensitive film 60 are removed by the lift off method. After the photosensitive film 60 and the second conductive layer 43 disposed on the photosensitive film 60 are removed, the transparent layer 45 and the remaining second conductive layer 43 may be planarized by a chemical mechanical polishing (CMP) process. The second conductive layer 43 and the transparent layer 45 disposed in the non-sensing area DA of the touch substrate 401 may have the same height as the transparent layer 45 disposed in the touch sensing area TA.

Figure 9A:
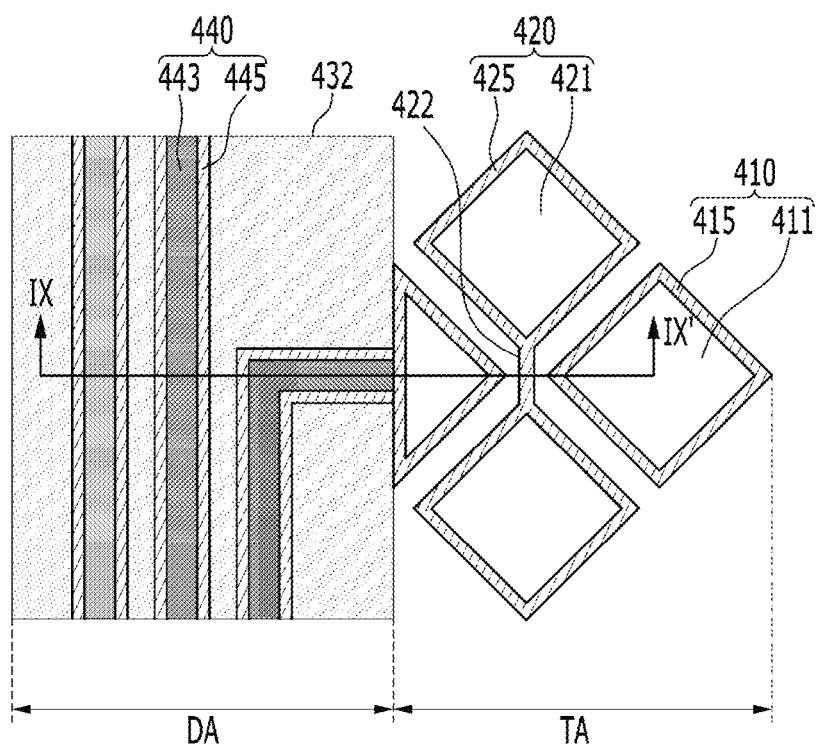
Figure 9B:
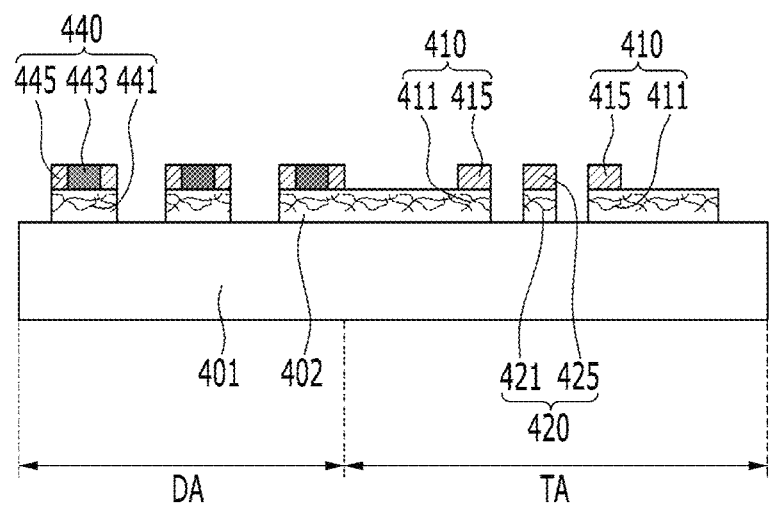

Referring to FIGS. 9A and 9B, a portion the first conductive layer 41 and the transparent layer 45 are removed from the touch sensing area TA by the etching method, etc., to form the first electrodes 410, the second electrodes 420, and the second connection parts 422, which are transparent. Alternatively, when the first electrodes 410 arranged in the same column are connected to each other by the first connection part 412 disposed on the same layer, the first connection part 412 may be formed instead of the second connection part 422. Each of the first electrode 410 and the second electrode 420 may include the lower electrode conductive layers 411 and 421 and the upper electrode conductive layers 415 and 425, respectively.

A portion of the first conductive layer 41 and the transparent layer 45 may be removed from the non-sensing area DA by the dry etching method, etc., to form the touch wiring 440. In this case, $CF_4$ may be mainly used as the etching gas, and the energy applied to the etching gas may prompt reaction between fluorine and $SiO_x$ or $AlO_x$. That is, the fluorine included in the etching gas may selectively etch the transparent layer 45, and not react with the first conductive layer 41 including the metal nanowire, thereby preventing damage to the first wiring conductive layer 441. The first touch wiring 440 includes the first wiring conductive layer 441, the second wiring conductive layer 443, and the transparent layer 445, which are disposed on the first wiring conductive layer 441.

Figure 10A:
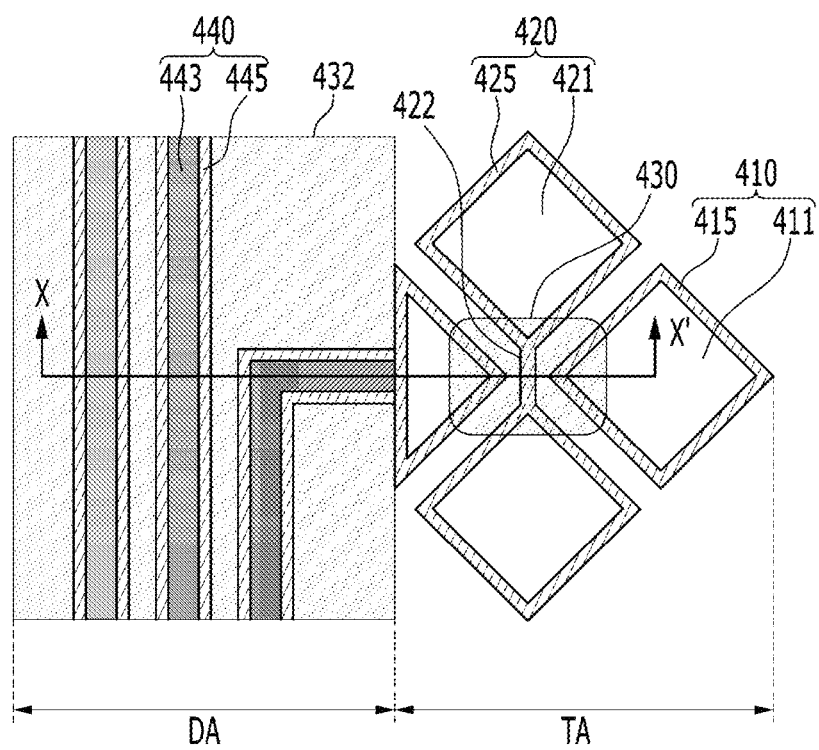
Figure 10B:
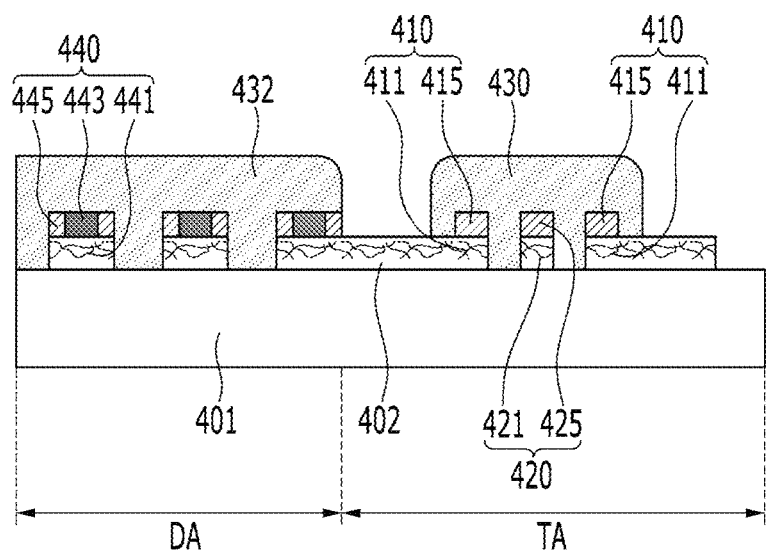

Referring to FIGS. 10A and 10B, an insulating material is disposed on the first electrode 410, the second electrode 420, the second connection part 422, and the touch wiring 440. The insulating material is patterned, such that a portion of the insulating material is disposed on the second connection part 422 to form a first insulating layer 430 covering the second connection part 422, and a portion of the insulating material is disposed on the touch wiring 440 to form a second insulating layer 432 covering the touch wiring 440.

Figure 11A:
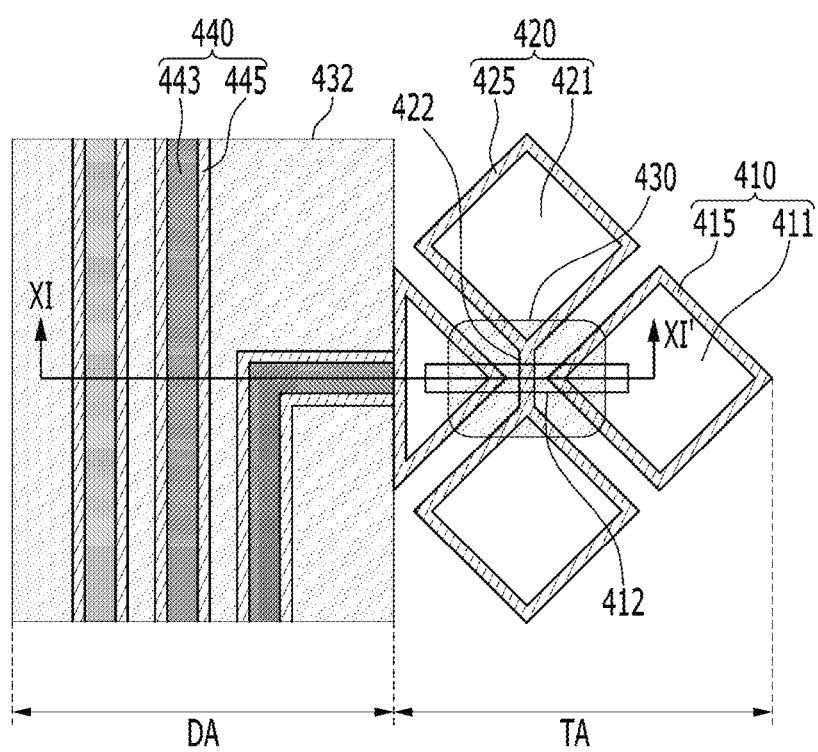
Figure 11B:
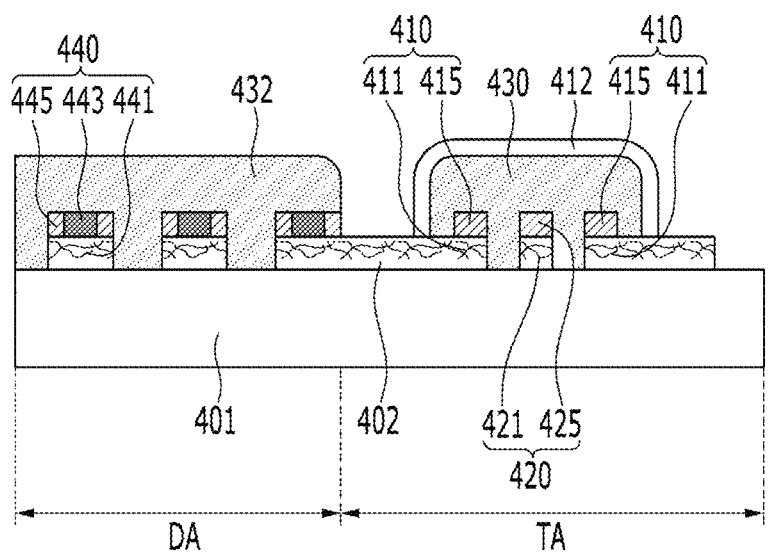

Referring to FIGS. 11A and 11B, a conductive material is disposed on the first insulating layer 430 and is patterned to form the first connection part 412 intersecting and insulated from the second connection part 422, and connect the first electrodes 410 adjacent to each other in one row.

Thus, in an exemplary embodiment of the present inventive concept, a touch wiring may have improved flexibility and conductivity, and prevent generation of corrosion in a touch screen.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A touch sensor, comprising:
   a touch substrate comprising a touch sensing area and a non-sensing area outside the touch sensing area;
   touch electrodes disposed in the touch sensing area and configured to sense a touch; and
   touch wiring connected to the touch electrodes in the non-sensing area,
   wherein:
   the touch wiring comprises:
      a first wiring conductive layer;
      a second wiring conductive layer disposed on the first wiring conductive layer; and
      transparent layers disposed at first and second sides of the second wiring conductive layer and on the first wiring conductive layer; and
   the second wiring conductive layer and the transparent layers have substantially a same height as each other.

2. The touch sensor of claim 1, wherein the first wiring conductive layer comprises a metal nanowire.

3. The touch sensor of claim 2, wherein the first wiring conductive layer further comprises an overcoat.

4. The touch sensor of claim 1, wherein the second wiring conductive layer comprises aluminum (Al).

5. The touch sensor of claim 1, wherein each of the transparent layers comprises an oxide-based transparent material.

6. The touch sensor of claim 5, wherein the oxide-based transparent material comprises silicon oxide ($SiO_x$) or aluminum oxide ($AlO_x$).

7. The touch sensor of claim 1, wherein the touch electrodes comprise a first electrode and a second electrode insulated from each other.

8. The touch sensor of claim 7, wherein each of the first electrode and the second electrode comprises a lower electrode conductive layer.

9. The touch sensor of claim 8, wherein the lower electrode conductive layer comprises the same material as the first wiring conductive layer.

10. The touch sensor of claim 8, wherein each of the first electrode and the second electrode further comprises an upper electrode conductive layer disposed on an edge of the lower electrode conductive layer.

11. The touch sensor of claim 10, wherein the upper electrode conductive layer comprises the same material as the transparent layers.

12. A touch sensor, comprising:
a touch substrate comprising a touch sensing area and a non-sensing area outside the touch sensing area;
touch electrodes disposed in the touch sensing area and configured to sense a touch; and
touch wiring connected to the touch electrodes and disposed in the non-sensing area,
wherein:
the touch wiring comprises:
a first wiring conductive layer;
a second wiring conductive layer disposed on the first wiring conductive layer; and
transparent layers disposed at a side of the second wiring conductive layer and on the first wiring conductive layer;
each of the touch electrodes comprises a lower electrode conductive layer and an upper electrode conductive layer; and
the transparent layers and the upper electrode conductive layer are disposed at a same layer as each other.

13. The touch sensor of claim 12, wherein the first wiring conductive layer comprises a metal nanowire.

14. The touch sensor of claim 13, wherein the first wiring conductive layer further comprises an overcoat.

15. The touch sensor of claim 12, wherein the second wiring conductive layer comprises aluminum (Al).

16. The touch sensor of claim 12, wherein the transparent layers comprise an oxide-based transparent material.

17. The touch sensor of claim 12, wherein the touch electrodes comprise a first electrode and a second electrode insulated from each other.

18. The touch sensor of claim 12, wherein the lower electrode conductive layer comprises the same material as the first wiring conductive layer.

19. The touch sensor of claim 12, wherein the upper electrode conductive layer is disposed on an edge of the lower electrode conductive layer.

20. The touch sensor of claim 12, wherein the upper electrode conductive layer comprises the same material as the transparent layers.

* * * * *